United States Patent
Fouarge et al.

(10) Patent No.: US 8,822,609 B2
(45) Date of Patent: *Sep. 2, 2014

(54) METHOD FOR TRANSFORMING A SINGLE REACTOR LINE

(71) Applicant: Total Research & Technology Feluy, Seneffe (BE)

(72) Inventors: Louis Fouarge, Dilbeek (BE); Eric Duchesne, Waterloo (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/180,799

(22) Filed: Feb. 14, 2014

(65) Prior Publication Data

US 2014/0163182 A1    Jun. 12, 2014

Related U.S. Application Data

(63) Continuation of application No. 12/280,620, filed as application No. PCT/EP2007/051659 on Feb. 21, 2007.

(30) Foreign Application Priority Data

Feb. 24, 2006   (EP) .................................. 06110380

(51) Int. Cl.
*C08F 2/01* (2006.01)
*C08F 2/12* (2006.01)
*B21K 21/16* (2006.01)
*B01J 19/18* (2006.01)
*B01J 4/00* (2006.01)

(52) U.S. Cl.
CPC ........................................ *C08F 2/01* (2013.01)
USPC ............... 526/65; 526/68; 422/132; 422/134; 29/401.1

(58) Field of Classification Search
USPC ......... 526/64, 65, 68; 422/132, 134; 29/401.1
See application file for complete search history.

(56) References Cited

U.S. PATENT DOCUMENTS

2005/0272891 A1 * 12/2005 Fouarge et al. ................ 526/943
2011/0166302 A1 *  7/2011 Fouarge et al. .................. 526/65

FOREIGN PATENT DOCUMENTS

WO    WO 02/28922 A1 *  4/2002

* cited by examiner

Primary Examiner — Fred M Teskin

(57) ABSTRACT

The present invention discloses a method for transforming a single reactor line into a double reactor line wherein the existing single reactor line is equipped with a flash tank for separating the solid polymer product from the flash vapor and wherein the vapor is sent to a system of at least two separating columns allowing the separation of its constituents into monomer, diluent and comonomer.

17 Claims, 4 Drawing Sheets

METHOD FOR TRANSFORMING A SINGLE REACTOR LINE

CROSS-REFERENCE TO RELATED APPLICSATIONS

This application is a continuation of Ser. No. 12/280,620, filed on Mar. 21, 2011, now issued a U.S. Pat No. 8,710,161, which claims the benefit of PCT/EP2007/051659, filed on Feb. 21, 2007, which claims priority EP 0611038.0, filed on Feb. 24, 2006.

The present invention discloses a method for transforming a single reactor line into a double reactor line.

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent is formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerisation zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner. The mixture is flashed in order to remove the liquid medium from the polymer. It is afterwards necessary to recompress the vaporised polymerisation diluent to condense it to a liquid form prior to recycling it as liquid diluent to the polymerisation zone after purification if necessary.

Settling legs are typically required to improve the polymer concentration in the slurry extracted from the reactor; they present however several problems as they impose a batch technique onto a continuous process.

EP-A-0,891,990 and U.S. Pat. No. 6,204,344 disclose two methods for decreasing the discontinuous behaviour of the reactor and thereby for increasing the solids concentration. One method consists in replacing the discontinuous operation of the settling legs by a continuous retrieval of enriched slurry. Another method consists in using a more aggressive circulation pump.

WO03/074167 also discloses a method for producing polymer in a continuous slurry loop reactor that comprises reacting a monomer in a hydrocarbon diluent to form a polymerization slurry of polymer solids in a liquid medium, continuously discharging a portion of the polymerization slurry through at least two discharge conduits, combining these effluents, flashing the combined effluent in a first flash to form a first flash vapour and a first flash slurry and condensing at least a portion of the first flash vapour without compression. This invention also discloses the conversion of a loop reactor having at least 8 legs into multiple loop reactors.

The double loop systems are quite desirable as they offer the possibility to prepare highly tailored polyolefins by providing different polymerising conditions in each reactor. It is however often difficult to find suitable space to build these double loop reactors as in the current configuration they need to be close to one another in order to insure adequate transfer of growing polymer from one loop to the other. The average velocity of the material circulating in the transfer line is of less than 1 m/s: these lines must therefore be very short in order to avoid sedimentation and clogging due to the polymerisation of residual monomers.

There is thus a need to obtain the advantages of double loop technology when the available space is limited or when there are budgetary constraints.

It is an aim of the present invention to transform a single reactor line into a double reactor line.

It is also an aim of the present invention to prepare bimodal resins by transforming a single reactor line into a double reactor line.

It is another aim of the present invention to separate the effluent into their various components and to re-inject them into the reactor each separately at the optimal point within the reactor.

Any one of these aims is achieved, at least partially, by the present invention.

Accordingly, the present invention discloses a method for transforming a single reactor line into a double reactor line
either by adding in front of the existing single reactor line another single reactor line that is either smaller than or of the same size as the existing reactor line;
or by transforming an existing single reactor line having at least 6 legs into a double reactor line
a) by rearranging the connection between vertical legs in order to obtain two separate reactors wherein the first reactor line is smaller than or of the same size as the second reactor line;
b) by adding a pump to the now separated reactor line; and
c) by adding a transfer line to transport product between the two reactor lines;
wherein the existing single reactor line is equipped with a flash tank for separating the solid polymer product from the flash vapour and wherein the vapour is sent to a system of at least two separating columns allowing efficient separation of the diluent, monomer and comonomer.

LIST OF FIGURES

Figure 1:
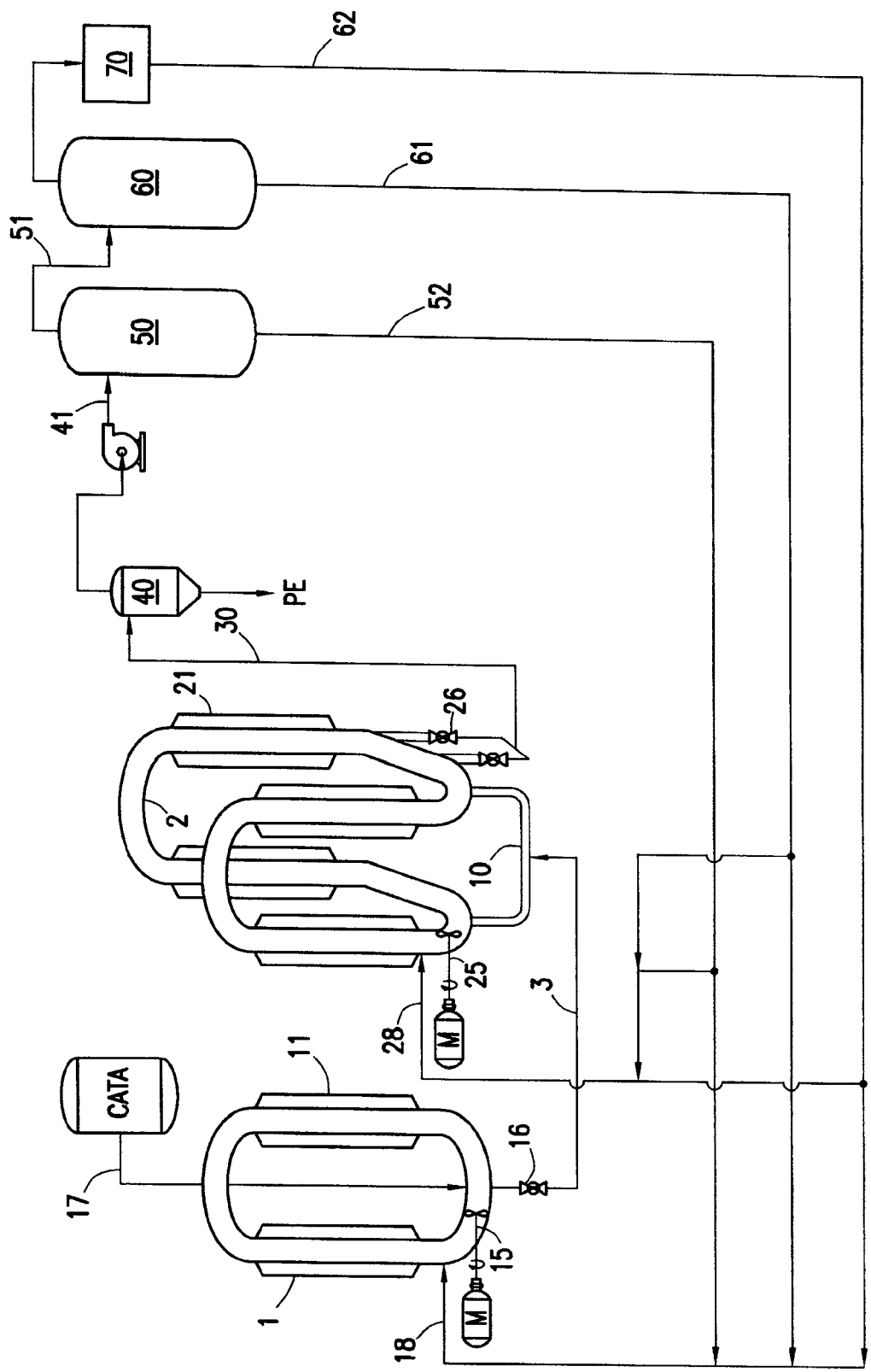
FIG. 1 represents a simplified configuration of the two reactor line system of the present invention, including the two reactor lines, the by-pass line and transfer line, the flash tank and the separation unit.

This invention relates to a polymerisation processes for the production of polymer, wherein a polymerisation effluent is formed which is a slurry of particulate polymer solids suspended in a liquid medium, ordinarily the reaction diluent and unreacted monomers.

The present invention is applicable to any process producing an effluent comprising a slurry of particulate polymer solids suspended in a liquid medium comprising a diluent and unreacted monomer.

The settled polymer slurry may be discharged from two or more settling legs through discharge valves in a predetermined sequential pattern so that the aggregate time of discharge for all the legs is more than 50%, preferentially more than 80% and most preferably more than 95% of the time between two triggerings of the same settling leg. In a most preferred embodiment the aggregate time of discharge for all the legs is from 95% to 100% of the time duration between two triggerings of the same settling leg.

As used herein the term "aggregate time of discharge" refers to the sum of the duration over which the discharge valve of each settling leg is open, said sum being across all settling legs and being limited to a single opening of each settling leg. By keeping at least one settling leg open more than 50%, preferably more than 80%, most likely more than 95% and most preferably 100% of the time between two consecutive triggerings of any single settling leg, fluctuations of reaction conditions in the reactor, and in particular of pressure values, are significantly reduced and even may be avoided.

The present process comprises the step of maintaining a flow of settled polymer slurry out of said reactor by sequentially discharging said settling leg.

The present invention relates to a polymerisation process for the manufacture of particulate olefin polymers consisting of the catalytic polymerisation of olefins such as $C_2$ to $C_8$ olefins in a diluent containing the monomer to be polymerised, the polymerisation slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerisation reaction can be carried out at a temperature of from 50 to 120° C., preferably at temperature of from 70 to 115° C., more preferably at temperature of from 80 to 110° C., and at a pressure of from 20 to 100 bars, preferably at pressure of from 30 to 50 bars, more preferably at pressure of 37 to 45 bars.

In a preferred embodiment, present invention is particularly suitable for the polymerisation of ethylene in isobutane diluent. Suitable ethylene polymerisation includes but is not limited to homopolymerisation of ethylene, copolymerisation of ethylene and a higher 1-olefin co-monomer such as 1-butene, 1-pentene, 1-hexene, 1-octene or 1-decene. In a preferred embodiment of the present invention, said co-monomer is 1-hexene.

Ethylene polymerises in a liquid diluent in the presence of a catalyst, optionally a co-catalyst, optionally co-monomer, optionally hydrogen and optionally other additives, thereby producing a polymerisation slurry.

As used herein, the term "polymerisation slurry" or "polymer slurry" means substantially a multi-phase composition including at least polymer solid particles and a liquid phase and allow for a third phase (gas) to be at least locally present in the process, the liquid phase being the continuous phase. The solids include catalyst and polymerised olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerisation reaction.

The polymerisation slurry is maintained in circulation in a loop reactor comprising vertical jacketed pipe sections connected through elbows. The polymerisation heat can be extracted by means of cooling water circulating in the jacket of the reactor. Said polymerisation may be performed in a single or in two or more loop reactors, which can be used in parallel or in series. Said reactors operate in a liquid full mode. When used in series they can be connected through means such as for example through one or more settling legs of the first reactor.

The produced polymer is discharged according to the process of the present invention from the loop reactor along with some diluent through two or more settling legs in which the solid content is increased with respect to its concentration in the body of the reactor.

Sequentially discharging includes also the situations where said settling legs may be alternately or simultaneously discharged.

The polymerisation unit of the present invention is very useful for the preparation of bimodal polymers, preferably bimodal polyethylene. It is schematically represented in FIG. 1.

The first reactor line (1) is equipped with a cooling jacket (11) and a circulating pump (15). Monomer and optional comonomer are injected respectively through line (18) downstream of the circulating pump, catalyst is injected through line (17) upstream of the circulating pump and polymer product is discharged through transfer line (16) upstream of the circulating pump and directed towards the by-pass line (10) connected to the second reactor line (2). The second reactor line is also equipped with a cooling jacket (21) and a circulating pump (25). Additional monomer is injected in the second reactor line through line (28) downstream of circulating pump (25).

Polymer product is discharged from the second reactor line preferably through two or more settling legs (26) and sent via line (30) to a flash tank (40) in order to separate the solid contents and the flash vapour. The flash vapour contains unreacted or under-reacted monomer, diluent and comonomers. In the present invention, the preferred monomer is ethylene or propylene, more preferably ethylene, the inert diluent is aliphatic hydrocarbon, preferably isobutane and the comonomer is an alpha-olefin having from 4 to 8 carbon atoms, preferably hexene. The condensed vapour thus contains mostly ethylene, isobutane and hexene. The solid product recovered from the flash tank is preferably polyethylene or polypropylene, more preferably polyethylene. It is dried and stored.

Figure 2:
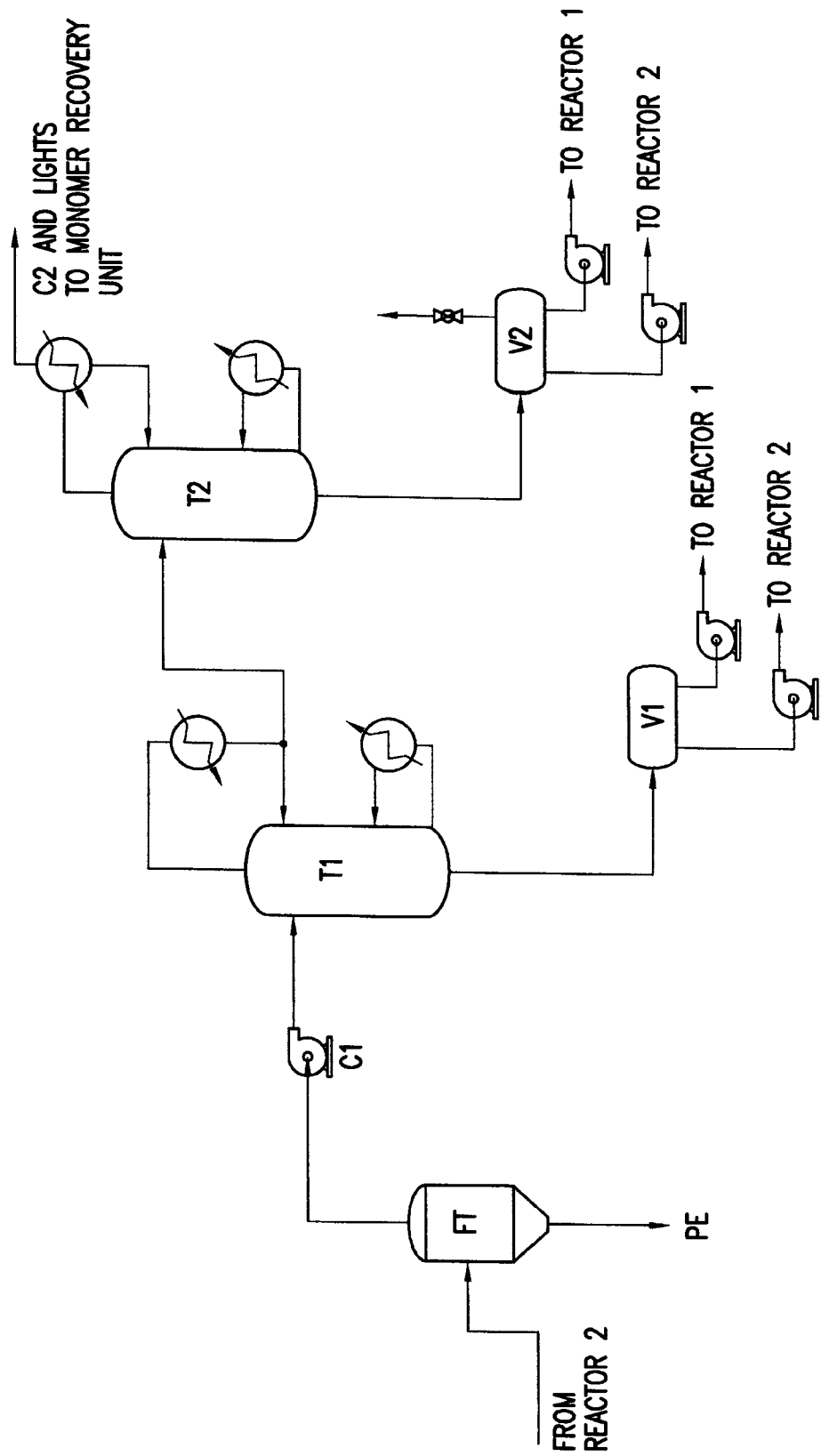
FIG. 2 is a diagram of the separation unit.

The compressed vapour is then sent through line (41) to a separation and recycling unit. The separation unit is schematically represented in FIG. 2. The treatment includes:
 a distillation step for purifying the gases emerging from the flash tank. This section is composed of at least two columns to perform the separation of monomer, comonomer and diluent
 a recycling step specifically designed to recover separately monomer, preferably ethylene (Ethylene Recovery Unit).

Gas emerging from the flash tank (FT) comprises mostly hydrogen, monomer, diluent and comonomer. In the preferred embodiment according to the present invention it contains thus hydrogen, ethylene, isobutane and hexene. These are purified in the distillation column.

It is first compressed in compressor C1 typically from a pressure of about 1.3 bar to a pressure of about 16 bars.

It is then sent to distillation column T1 for the recovery of heavies, wherein said heavies are recovered at the bottom of the column through lateral extraction. The extracted flux is rich in comonomer: it is cooled down and sent to the recycled comonomer surge tank (V1) from where it is pumped to the reactor after drying. Other heavies are periodically extracted in order to maintain the level of hexene purity at about 90%.

The top of the column is directed to the second distillation column T2 together with fresh diluent.

The product extracted at the bottom of the column is pure diluent and does not contain hydrogen or monomer. That product is cooled down and stocked in surge tank (V2) from where it is pumped to the reactor after drying. It is suitable for catalyst dilution.

The products emerging from the top of the column are condensed with cooling water and then in a heat exchanger that is cooled by diluent under reduced pressure to a temperature near 0° C. The un-condensable products containing monomer, traces of ethane and nitrogen are dried and sent to the ethylene recovery unit.

In the best mode according to the present invention, ethylene is recycled back to any one or to both of the reactor lines, downstream of the circulating pump, isobutane is recycled back to any one or to both of the reactor lines upstream of the circulating pump and hexene is optionally recycled to only one of the reactor lines downstream of the circulating pump.

In a preferred embodiment according to the present invention, the monomer is ethylene. The comonomer is hexene and it is recycled to any one of the reactor lines. This configuration is used to prepare bimodal polyethylene. In one configuration hexene is supplied to the first reactor line in order to provide the high molecular weight fraction of the polymer and hydrogen is supplied to the second reactor line in order to prepare its low molecular weight fraction. Alternatively, the reverse configuration can be used wherein hydrogen is supplied to the first reactor line in order to prepare the low molecular weight fraction of the polymer and hexene is supplied to the second reactor line in order to provide its high molecular weight fraction.

Alternatively, the same conditions can be used in both reactors in order to prepare a "false" monomodal polymer as described for example in EP-A-905146. In this instance, hexene may be recycled back to both reactor lines.

The separation unit is thus an essential feature of the present invention as it guarantees full benefit of the double loop technology.

Figure 3:
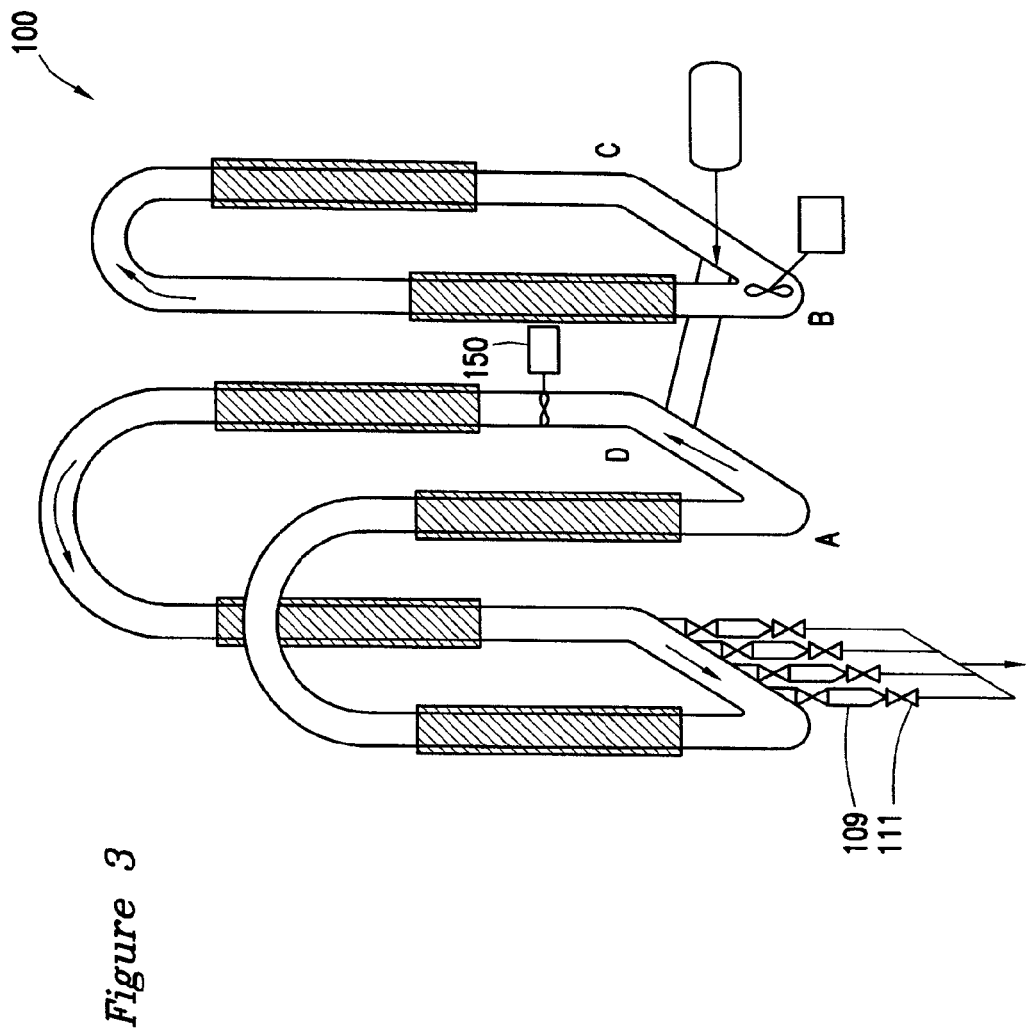
FIG. 3 represents the connections of a single, reactor line having 6 legs and the same reactor differently re-connected to create a double reactor line.

In a preferred embodiment according to the present invention, a single reactor line Having 6 legs is transformed into a double reactor line 100 wherein the first line has two and the second line has 4 legs. In the embodiment represented in FIG. 3 connecting segments AB and CD of the existing reactor line are suppressed and they are replaced by connections AD and BC. The first reactor line has at most the same capacity as that of the second reactor line, preferably it has a smaller capacity than that of the second reactor line.

The reactor line that is equipped with the discharge unit, consisting preferably of one or more settling legs 109 and discharged valves 111, becomes the second reactor line. A circulating device, 150, preferably a circulating pump is added to said second reactor line, preferably as far as possible from the discharge unit.

The catalyst system must be fed into the first reactor line. The catalyst feed must therefore be rerouted if necessary.

Figure 4:
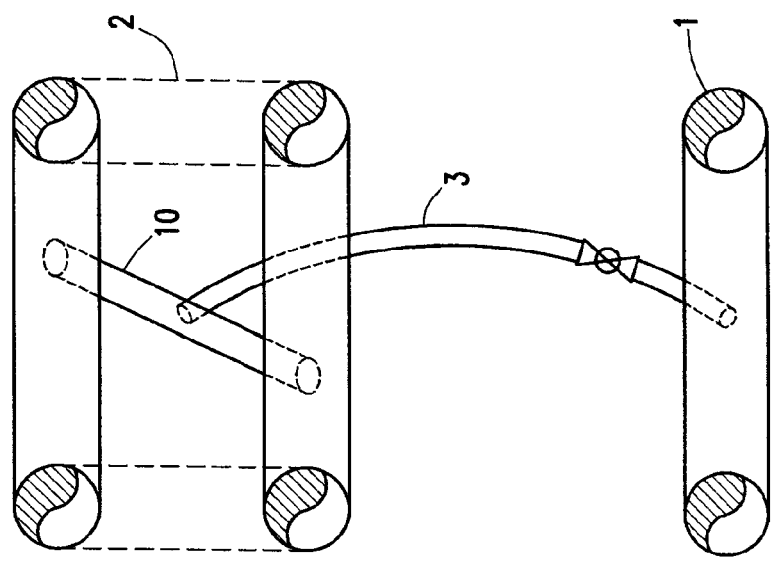
FIG. 4 is a view from the top of the configuration used for transferring polymer product from the first to the second reactor line: it comprises a transfer line and a by-pass line.

A transfer system is installed between the two reactor lines in order to transfer the polymer product from line 1 to line 2. The transfer system may be continuous or discontinuous, in which case it is equipped with settling legs: a preferred system according to the present invention is described for example in WO05/080444. In a most preferred embodiment according to the present invention, the transfer line is connected to a by-pass line, itself connected to the second loop reactor as represented in FIG. 4. The by-pass line (10) connects two points of the second reactor line (2) by an alternate route having a different transit time than that of the main route: it is fully described in EP-A-1542793. The transfer line (3) collects polymer product from the first reactor line (1) and inject it into the by-pass line connected to the second reactor line.

Preferally, the legs are jacketed with cooling liquid.

An advantage of the present invention is that it is easily obtained starting from an existing reactor line. The complex downstream equipment is correctly dimensioned, the production remains unchanged and the cost is minimal.

In the situation where on the contrary a new reactor unit is added, it is necessarily added upstream of the existing unit in order to keep the complex downstream equipment unchanged. The capacity of the existing reactor remains unchanged, but the full volume of the new double line is thus not used to its full capacity.

EXAMPLES

Example 1

Distillation Column

|  | Heavies column | Lights column |
| --- | --- | --- |
| Feed (kg/h) | 12600 | 11650 |
| Composition (wt %) nC4 + iC4 | 84 | 90.6 |
| C2 = | 10 | 9.4 |
| C6 = | 6 | traces |
| Temperature (° C.) | 98 | 70 |
| Pressure (barg) | 15 | 13.6 |
| Bottom | | |
| Temperature (° C.) | 175 | 88 |
| Withdraw kg/h | (hexene) 530 | (isobutene) 9650 |
| Steam flow (kg/h) | 650 | 400 |
| Top | | |
| Temperature (° C.) | 75 | 30 |
| Reflux rate (kg/h) | 7700 | 9800 |
| Pressure (barg) | 14.5 | 13.5 |

The bottom of the lights column clearly does not contain any comonomer. The comonomer extracted from the bottom of the heavies column can thus be fed to any one of the reactor lines in order to produce polymer having a bimodal molecular weight distribution.

Example 2

Addition of a Reactor Line in Front of an Existing Reactor Line

The existing reactor line had the following characteristics:
Reactor volume: 37 m$^3$
Number of settling legs: 4
Reactor diameter: 500 mm
Polymer production rate; 12 t/h
Circulation speed: 10.6 m/s
Ethylene concentration: 8 wt %
Temperature: 92.5° C.

Power of circulation pump: 380 kW.

Another reactor line was added in front of that reactor line. It had the following characteristics:

Reactor volume: 19 m$^3$
Reactor diameter: 500 mm
Polymer production rate: 5 t/h
Circulation speed: 10 m/s
Ethylene concentration: 8 wt %
Temperature: 92° C.
Solids concentration: 40%.

The final reactor system had the following characteristics:

Production rate second reactor after addition of reactor in front: 7 t/h
Total throughput: 12 t/h
Solid concentration in reactor: 45%
Solid concentration in settling legs: 54%
Circulation speed: 10 m/s.

The invention claimed is:

1. A method for transforming a single reactor line into a double reactor line comprising:
   transforming a first existing single reactor line into a double reactor line wherein the first existing single reactor line comprises at least 6 legs, and wherein the first existing single reactor line is transformed by:
      rearranging connections between the legs in order to obtain a first reactor line and a second reactor line, wherein the first reactor line has a smaller capacity than that of the second reactor line;
      adding a pump to the first reactor line, the second reactor line or combinations thereof; and
      adding a continuous transfer line to transport polymer from the first reactor line to the second reactor line;
   wherein the first existing single reactor line comprises two or more settling legs configured to sequentially discharge settled polymer slurry.

2. The method of claim 1, wherein polymer product exiting the first reactor line is sent to the second reactor line through a transfer line connected to a by-pass line installed on the second reactor line.

3. The method of claim 1, wherein the settling legs are configured to alternatively or simultaneously sequentially discharge the settled polymer slurry.

4. The method of claim 1, wherein the settling legs are configured to sequentially discharge the settled polymer slurry in a predetermined sequential pattern so that an aggregate time of discharge for all settling legs is more than 50% of a time duration between two triggerings of the same settling leg, wherein the aggregate time of discharge is a sum of a duration over which a discharge valve of each settling leg is open, said sum being across all settling legs and being limited to a single opening of each settling leg.

5. The method of claim 4, wherein the aggregate time of discharge for all settling legs is more than 80% of the time duration between two triggerings of the same settling leg.

6. The method of claim 4, wherein the aggregate time of discharge for all settling legs is more than 95% of the time duration between two triggerings of the same settling leg.

7. The method of claim 4, wherein the aggregate time of discharge for all settling legs is from 95% to 100% of the time duration between two triggerings of the same settling leg.

8. The method of claim 1, wherein the continuous transfer line is equipped with settling legs.

9. A polymerization process comprising:
   introducing an olefin monomer into a reaction vessel;
   contacting the olefin monomer with a catalyst system within the reaction vessel; and
   sequentially discharging polymer product from the reaction vessel, wherein the reaction vessel comprises:
      a first existing single reactor line comprising at least 6 legs, wherein the first existing single reactor line is transformed into a double reactor line by:
         rearranging connections between the legs in order to obtain a first reactor line and a second reactor line, wherein the first reactor line has a smaller capacity than that of the second reactor line;
         adding a pump to the first reactor line, the second reactor line or combinations thereof; and
         adding a continuous transfer line to transport polymer from the first reactor line to the second reactor line.

10. The process of claim 9, further comprising recycling the olefin monomer, a diluent, and a comonomer back to any of the reactor lines.

11. The process of claim 9, wherein sequentially discharging the polymer product comprises discharging the polymer product through two or more settling legs of the reaction vessel.

12. The process of claim 11, wherein sequentially discharging the polymer product comprises alternatively or simultaneously discharging the polymer product through the two or more settling legs of the reaction vessel.

13. The process of claim 11, wherein sequentially discharging the polymer product is performed at in a predetermined sequential pattern so that an aggregate time of discharge for all settling legs is more than 50% of a time duration between two triggerings of the same settling leg, wherein the aggregate time of discharge is a sum of a duration over which a discharge valve of each settling leg is open, said sum being across all settling legs and being limited to a single opening of each settling leg.

14. The process of claim 13, wherein the aggregate time of discharge for all settling legs is more than 80% of the time duration between two triggerings of the same settling leg.

15. The process of claim 13, wherein the aggregate time of discharge for all settling legs is more than 95% of the time duration between two triggerings of the same settling leg.

16. The process of claim 13, wherein the aggregate time of discharge for all settling legs is from 95% to 100% of the time duration between two triggerings of the same settling leg.

17. The process of claim 9, wherein the continuous transfer line is equipped with settling legs.

* * * * *